Figure 1:
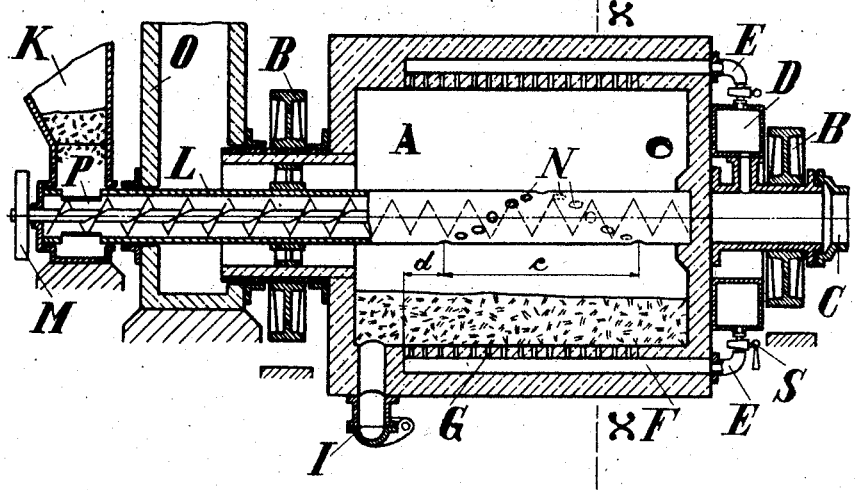

F. C. W. TIMM.
PROCESS OF TREATING METALLIFEROUS MATERIALS FOR ROASTING, REDUCING, SINTERING, AND LIKE PURPOSES.
APPLICATION FILED OCT. 30, 1913.

1,189,313.  Patented July 4, 1916.

WITNESSES:
John C. Sanders
H. B. Cottrell

INVENTOR:
Friedrich Carl Wilhelm Timm
BY Wm Wallace White
ATTY

UNITED STATES PATENT OFFICE.

FRIEDRICH CARL WILHELM TIMM, OF HAMBURG, GERMANY.

PROCESS OF TREATING METALLIFEROUS MATERIALS FOR ROASTING, REDUCING, SINTERING, AND LIKE PURPOSES.

1,189,313.

Specification of Letters Patent. Patented July 4, 1916.

Application filed October 30, 1913. Serial No. 798,176.

*To all whom it may concern:*

Be it known that I, FRIEDRICH CARL WILHELM TIMM, a subject of the Emperor of Germany, residing at Hamburg, Germany, have invented new and useful Improvements in Processes of Treating Metalliferous Materials for Roasting, Reducing, Sintering, and like Purposes, of which the following is a specification.

The invention relates to a special method of carrying out the so-called "blowing process", in itself familiar in metallurgy as "pot-roasting", for the purpose of roasting, reducing and sintering together ores and the like.

At the present time the blowing is, as a rule, so carried out that the fire gradually advances through the charge from the ignited side of the same to the opposite side, the charge being placed on fixed or traveling grates and being mixed with the total quantity of fuel necessary or naturally present, and the air being heated by the part of the charge already blown, abandoned by the reaction zone, and hot. But with some materials considerable disadvantages arise when blowing is effected according to this well known manner, which disadvantages show themselves, for example, in the overheating in some places and insufficient heating in others, in an incompletely carried out reaction, in an irregular settlement of the substance (particularly in the case of an excess of fuel and of fuel of a voluminous nature) and in similar ways.

The present process, however, has for its object the carrying out of the blowing under such conditions that the transference of heat is well effected everywhere for a sufficient time at approximately the best reaction temperature, and without harmful overheating in single places, and that the charge in the blown portion always lies with practically an equal density.

The process consists in blowing a hot charge, repeatedly mixed with heating materials, in such a way that during the blowing it always contains only a comparatively small quantity of the heating material. A charge therefore which contains the total heating material necessary for its treatment is not blown, but one with which is mixed always only a small proportion thereof.

Specially good results may be attained if the quantity of heating material employed is maintained as regular as possible, and if for this purpose heating material is again introduced into the charge in about the same quantity as has been burnt out of it, either after a certain period of blowing or uninterruptedly during the blowing. Further, it is advantageous to mix the charge not only with the added heating material but also in itself with its variously hot portions. This is effected in the simplest manner by interrupting the blowing of the charge, or of a portion of the same, for a short time, then mixing the fresh heating material with the charge, and afterward blowing again.

On blowing substances which already contain heating material, for example ores containing sulfur or mixed with carbon, fresh substance is introduced into already blown, hot substance, exactly like pure heating material. Then after a certain period of blowing, or after a certain number of mixing and blowing periods, the charge consists of a mixture, in one constituent part of which, (the greater quantity), the appropriate treatment has been effected very completely, and in the other, (the smaller quantity), it has not yet been completed; between these lie transition stages.

In connection with the blowing according to the present process the blown substance thereby obtained may afterward also be further blown in the familiar manner, for example with a gradually advancing reaction zone in the common pots, or it may be subjected to some other suitable treatment.

In the above description the words "heating material" signify such materials as, when present in the charge to be blown, evolve heat by their combustion. In particular sulfur and carbon or materials containing sulfur or (and) carbon are thereby to be understood. But iron or other metals finely distributed in the charge may also be used in quite a similar manner.

The process is destined for the oxidizing, chloridizing, sulfatizing or magnetic roasting of ores or other materials, for example of the metals iron, lead, zinc, copper, silver, gold, arsenic, and so forth; for the reduction of oxids, hydroxids, carbonates, silicates, sulfids or sulfates for example of the metals zinc, lead, copper, iron, sodium, potassium and so forth, to metals (metallic vapors of volatile metals) or to lower oxidation stages; for the volatilization of metals from oxids, sulfids or sulfates, with re-oxidation (for example for zinc, lead, bismuth, arsenic, antimony, sodium, potassium and so forth); for sintering and agglomerating zinc ore, flue dust, pyrites residue, and the like; for reducing sulfates to sulfids, for example barytes to barium sulfid; and for other methods of treatment possible by blowing.

The air used for blowing may be sometimes previously heated with advantage. In addition suitable gases or vapors may be added to it, and its oxygen content may be increased or decreased. The air used for blowing or the gas may be introduced into the charge as well from above as from below or laterally.

In the present specification the expression "blowing" is used, for the sake of brevity, for a treatment by heat of fragmentary, especially minutely fragmentary or floury substances, the heating material in question being distributed in the charge and being burnt out of it by air or some other gas conducted through by means of pressure or suction. Further, the limitation is also made that the charge is not brought by the blowing to the point of complete melting, but at the most of softening or of sintering.

The process is, in the case of roasting zinc blende for example, carried out in the following manner: Some blende is introduced through an opening in the upper side into a closed converter provided with an air inlet through one trunnion and with a gas outlet through the other. By rotating the converter this is mixed with the rest of the contents, consisting of almost completely roasted blende; the converter is stopped in a suitable position, and then blown for a comparatively short time. Thereupon the blast is cut off, some roasted substance taken out, an appropriate quantity of blende again filled in, this is again mixed by rotation with the rest of the contents, is again blown and so on. By suitably regulating the time of blowing in one period and the quantity of admixed raw blende the heat may be maintained below a temperature causing a sintering of the materials, thus producing a product well adapted for subsequent reducing purposes. By the removal of the roasted substance at the side at which the blast enters, somewhere near the hearth in blowing in an upward direction, the smallest sulfur content may be obtained, and even this may be practically completely removed, in so far as it is not combined with alkalin earths, by blowing the removed hot substance with very little air in the usual manner.

If by way of example 1 part of raw blende with 30 per cent. sulfur is added to some 9 parts of roasted blende, then the sulfur content of the mixture rises by 3 per cent., but with moderate pre-heating of the raw blende the temperature only sinks from about 1000° to about 930° centigrade. The air is also heated to just as high a temperature by the comparatively large quantity of the charge, very quickly after its entry into the same, and thus effecting a quick roasting. On the other hand the small proportion of fuel (sulfur) to the charge has the effect that no harmful heating takes place near the support (grate). In this example about 3 per cent. by weight of the sulfur is removed from the charge in each blowing period, whereby the mean temperature again rises from 930° to 1000° C. Instead of the proportion 1 to 9 of raw to already blown blende, this may also be made for example 1 to 3 or 1 to 20 or otherwise.

Another application of the process lies in the sulfatizing roasting of copper ores or of complex lead-zinc sulfids, in order to subsequently leach out the metal contents, it being possible by making the content of heating material small and by an appropriate length of the blowing period, to keep the temperature so low that there can be no destruction of the sulfate once formed. The same feature occurs in connection with a sufficiently long reaction period which is favorable to the chloridizing roasting of copper ores, pyrites residues or the like, for the purpose of subsequently leaching out the chlorin metal compound, or of the chloridizing roasting of ores or the like containing precious metals, especially gold or silver or other metals, as copper, for the purpose of volatilizing such metals or metal compounds (chlorin metal compounds), and to the magnetizing roasting of iron ores for the purpose of magnetic separation. According to requirements in the various cases, one heating material (for example, sulfur) is supplemented by another (for example, fuels containing carbon). Further, as an advantageous application of the process, attention may specially be called to the recovery of zinc or other volatile metals such as lead, bismuth, antimony, arsenic or the like, either in the form of vapors for the purpose of subsequent condensation or of separation as dust, or in the form of an oxygen compound for the purpose of subsequent separation from the gases by filters or the like, from a mixture of solid carbon-containing materials (coal or coke) and ores that may be previously roasted, according to circumstances, or other raw materials. Further, the process is adapted to the roasting of fine pyrites, the high sulfur content of which causes trouble in many ways with the usual method of blowing. In this case the main point is the recovery of sulfurous acid or sulfuric acid; similarly these, and by chloridizing roasting also hydrochloric acid, may be recovered in roasting other materials.

Figure 2:
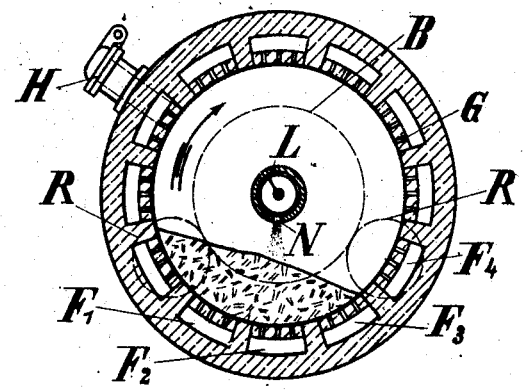

In the illustration is shown by way of example in Fig. 1, a longitudinal section and in Fig. 2 a cross section on the line X—X of Fig. 1 of a furnace specially suited for carrying out the process. The drum A, lined with suitable fire-proof materials, is mounted on supporting rollers R and running rings B, and for various reasons is disposed preferably with a slight inclination. It may be rotated by driving devices not illustrated. The air is introduced through the stationary pipe C, then passes over into the annular chamber D connected with the drum, and from there is conducted through pipes E into channels F which are covered over with perforated plates G. H and I are closable doors the former serves for the admission of the substance to be treated, and the latter for the removal of finished substance. The heating material is filled into the hopper K and taken out of the same by a suitable feeding apparatus, for example by a conveyer tube L, provided with openings P, with a helix lying therein and driven by a pulley M. The pipe L is connected with the drum and rotates therewith. The heating material moving forward in L falls down through openings N along the space $c$ on to the charge lying in the drum, it being sometimes advantageous to bring about an unequal distribution by means of a variation in size of the openings N. Further, tappets, not illustrated, are provided which actuate the cocks S in the pipes E in such a manner that only those cocks are opened which put the channels F into connection with the air conduit when at any time such channels are covered with a deep layer of materials while the rest of the cocks are closed. The gaseous products of combustion escape into the space O, to be led away, and in given cases to be further treated. Along the space $d$ no heating material falls down; but here also air is driven through the charge, and this burns the heating material still present or a part thereof, the treatment of the substance being thus completed. The contents of the furnace gradually advance from the supply side to the emptying side, and the treatment is in proportion to the forward movement.

If the furnace described is used, for example, for volatilizing zinc from suitable materials, then these are admitted through the door H, and through the hopper K on the other hand is admitted fine coal, coke, or the like. But a mixture of both, such as for example the residual ashes of zinc retorts, may be admitted exclusively through the hopper K, or H as well as K may be used for the admission. In roasting pyrites, blende, galena or similar materials, which already contain the heating material or a portion thereof in advance, their admission is preferably effected through K and L alone. The conditions of pressure and quantity of the air, as well as the number of rotations, are preferably regulated in such a way that the appropriate cocks S are closed before the reaction has advanced quite through the charge up to the upper surface. By these means the highest content of sulfurous acid for example, may be attained. In such a furnace the blowing is effected with approximately continuous action: on rotation in the direction of the arrow, the channel $F^3$ is connected to the air conduit immediately after the closing of the channel $F^1$, and so on. In addition, that portion of the charge which is under the blowing action at a given moment remains at rest, for the movement (the slipping down to the angle of repose) is only effected at the upper surface, where no reaction takes place. On their connection to the air conduit the perforated plates G are always covered with a charge mixed in itself with heating materials.

If no importance is attached to carrying on the working as continuously as possible, the furnace illustrated may be fitted on one portion only of its inner surface with one or several channels F and one or several segments G pervious to gas.

It has already been proposed to roast zinc blende by blowing in rotary furnaces. But in that case it was a question of a charge which from the commencement contained the whole of the sulfur which was to be removed by blowing, and the sulfur therefore diminished during the advance in the furnace, and was not again regularly supplemented as in the case of the process and the apparatus here described. Further, it has been proposed to stir blende during the blowing. But in the present process the portion of the charge subjected to blowing is kept at rest. In that case a further mark of distinction also lies in the gradual admission of heating material (sulfur) as against one single admission in the known process.

Claims:

1. The process of treating material consisting in introducing a charge of such material into a furnace, heating said charge and repeatedly adding solid heating materials to the hot furnace charge so that during the internal combustion only a portion of the total quantity of heating material necessary for treatment of the charge is present in the same.

2. The process of treating material consisting in introducing a charge of such material into a furnace, heating said charge and repeatedly adding a quantity of solid heating materials to the hot furnace charge, said quantity being approximately equal in amount to the quantity of material sufficiently treated and removed from the charge, so that during the internal combustion only a portion of the total quantity of heating material necessary for treatment of the charge is present in the same.

3. The process of treating materials consisting in introducing a charge of such material into a furnace, heating said charge and repeatedly adding a quantity of solid heating material to the hot furnace charge, said quantity being approximately equal in amount to the quantity of material sufficiently treated and removed from the charge so that during the internal combustion only a portion of the total quantity of heating material necessary for treatment of the charge is present in the same.

4. The process of treating materials consisting in introducing a charge of such materials into a furnace, repeatedly introducing fuel into said charge, gradually supplying fuel to one portion only of said charge, while the other portion thereof is treated by burning the residual heating materials in said portion by means of gases of oxidizing character conducted therethrough.

5. Process for the treatment of a mixture of metalliferous materials and materials containing solid carbon consisting in introducing a charge of such materials into a furnace, heating said charge, repeatedly adding heating materials to the hot furnace charge so that always only a portion of the total quantity of heating material necessary for the treatment of the furnace charge is present in the same and discharging the gaseous products of combustion to prevent collecting and separating out from the gases the metals volatilized out of the charge.

6. The process of treating materials consisting in introducing a charge of such materials into a furnace, heating said charge and repeatedly adding a quantity of solid heating material to the hot furnace charge, said quantity being approximately equal in amount to the quantity of material sufficiently treated and removed from the charge so that during the internal combustion only a portion of the total quantity of heating material necessary for treatment of the charge is present in the same and intermittently mixing said charge with the heating materials.

7. The process of treating materials consisting in introducing a charge of such materials into a furnace, gradually supplying fuel to one portion only of said charge, stopping the introduction of fuel to the other portion thereof and burning the residual heating materials in said portion by means of gases of oxidizing character conducted through said residual heating materials.

8. A process for the treatment of materials of a metalliferous nature, consisting in subjecting the same to heat produced by the internal combustion of the heating materials in a furnace charge, conducting gases through the same while keeping the temperature thereof below the temperature necessary for the hot furnace charge and evenly distributing therein by mingling both, solid heating materials and such materials containing solid heating materials, so that during the internal combustion only a small portion of the total quantity of heating material necessary for the treatment of the furnace charge is present in the same.

In testimony where I have signed my name to this specification in the presence of two subscribing witnesses.

FRIEDRICH CARL WILHELM TIMM.

Witnesses:
ERNEST H. L. MUMMENHOFF,
EDWARD HORPF.